E. M. FRASER.
ELECTRIC ELEVATOR SYSTEM.
APPLICATION FILED AUG. 25, 1914.
1,237,321.
Patented Aug. 21, 1917.
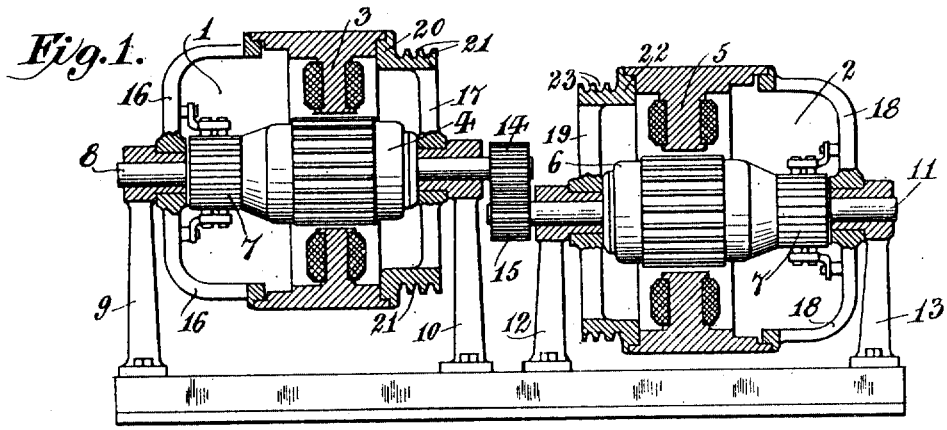
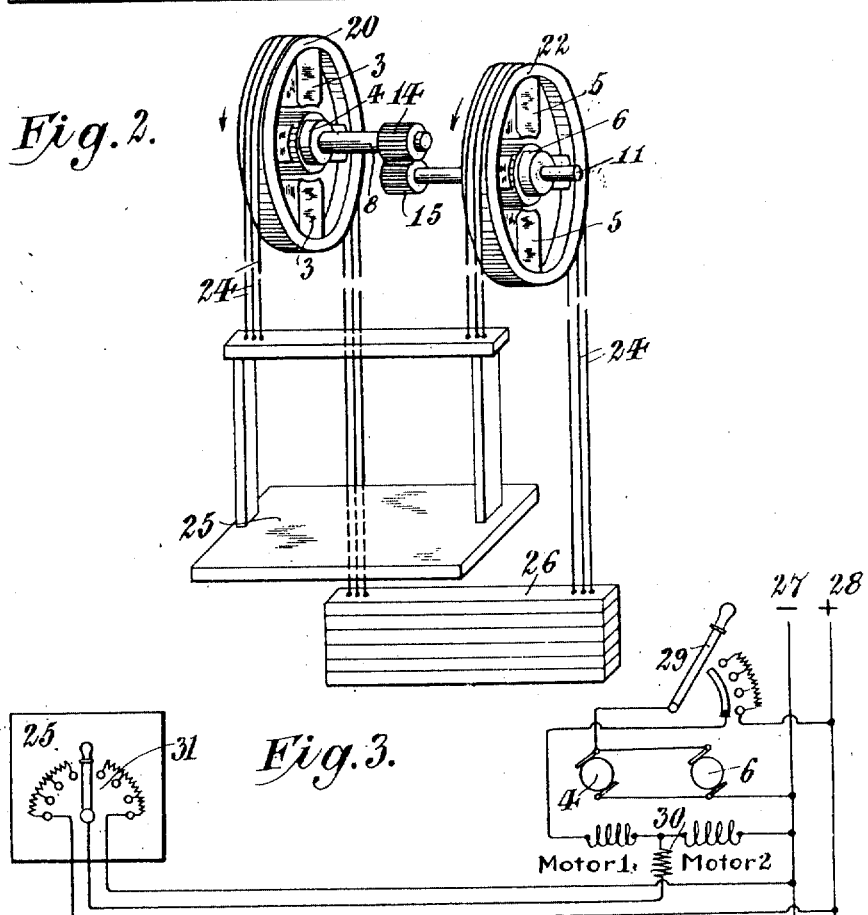
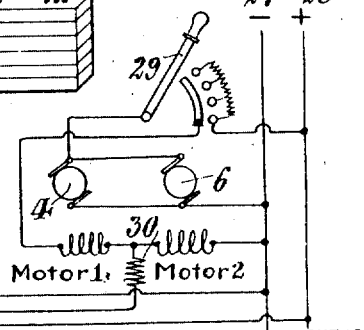
WITNESSES
INVENTOR
Ethelbert M. Fraser
BY
Kiddle & Margeson
ATTORNEYS

UNITED STATES PATENT OFFICE.

ETHELBERT M. FRASER, OF YONKERS, NEW YORK, ASSIGNOR TO GENERAL ELEVATOR COMPANY, OF JERSEY CITY, NEW JERSEY, A CORPORATION OF NEW JERSEY.

ELECTRIC ELEVATOR SYSTEM.

1,237,321.

Specification of Letters Patent. Patented Aug. 21, 1917.

Application filed August 25, 1914. Serial No. 858,442.

*To all whom it may concern:*

Be it known that I, ETHELBERT M. FRASER, a citizen of the Dominion of Canada, residing at Yonkers, county of Westchester, and State of New York, have invented a new and useful Improvement in Electric Elevator Systems, of which the following is a specification.

My invention relates to an electric elevator system or hoisting apparatus, of the traction type, comprising two electric machines, each having two rotors, one of which rotors includes an armature and the other a field, said rotors being so connected that when operated one rotor of one machine will rotate in the same direction as one of the rotors of the other machine, and the other two rotors will rotate in directions the reverse of each other. In other words, when the system or apparatus is being operated three of the rotors will rotate in the same direction, while the fourth rotor will rotate in a direction the reverse of the other three. Such a system is not only shown herein but also in reissued United States Letters Patent No. 13,806, granted to me on October 13th, 1914, for an electric elevator system.

As shown and described herein, my improved electric elevator system or hoisting apparatus comprises two electric machines, each having two rotors magnetically and electrically coöperating with each other and providing an armature and a field structure, one of the rotors of one machine being suitably geared or connected to one of the rotors of the other machine so that said rotors will always rotate in directions the reverse of each other, and the other rotors will through the medium of suitable power-transmission means rotate in the same direction. In such a system or apparatus if the outer rotors include the field magnets, they are so arranged and constructed that they can rotate in either direction, and the inner rotors which include the armatures are mechanically connected together by suitable gearing so as to always rotate in directions the reverse of each other. In such arrangements it is to be understood that one rotor of each machine preferably carries or drives a power-transmission member and that these two rotors rotate intermittently while the other two rotors of said machines which are geared together continuously rotate in directions the reverse of each other when the system is in operation.

The objects of my invention will appear from the drawings and the detailed description to follow.

A preferred form of an electric elevator or hoisting system embodying my invention is illustrated in the accompanying drawing forming a part of this specification, in which—

Figure 1 is a view partly in section of the two electric machines, each machine comprising an outer rotor or field structure and an inner rotor or armature, the armatures being suitably geared together so as to rotate in opposite directions, the outer rotors or field structures carrying power-transmission members or sheaves.

Fig. 2 is a view illustrating diagrammatically the combination of the two driving sheaves of the two electric machines with elevator car or hoist and the counterweight, and the power-transmission means connecting the car and counterweight with the two machines. In this view the armatures are illustrated as being geared together so as to rotate in directions the reverse of each other.

Fig. 3 is a wiring diagram.

Referring to the drawings, the two electric machines 1 and 2, which are preferably of the shunt-wound type, constitute a motor-generator set. Machine 1 comprises an outer rotor or field structure 3 and an inner rotor or armature 4, and machine 2 comprises an outer rotor or field structure 5 and an inner rotor or armature 6. Each machine is also provided with a commutator 7.

Armature 4 is provided with a shaft 8 which is rotatably journaled in the standards 9, 10. Armature 6 is also provided with a shaft 11 which is rotatably journaled in the standards 12, 13. The two armatures 4, 6 are mechanically connected together by means of a spur gear 14, secured to the armature shaft 8, and the spur gear 15 secured to the armature shaft 11, these two gears 14 and 15 meshing with each other so that the armatures 4 and 6 will always rotate in directions the reverse of each other.

The field structure 3 is rotatably mounted upon the standards 9 and 10 by means of the spider or end-bell 16, and the spider or end-bell 17, and the field structure 5 is rotatably mounted upon the standards 12 and 13 by means of the spider or end-bell 18 and the spider or end-bell 19. With this construction the armatures 4, 6 must rotate in directions the reverse of each other and the field structures 3, 5 are rotatable in either direction. The spider or end-bell 17 is preferably provided with a pulley or sheave 20, which is suitably provided with grooved portions 21; and the spider or end-bell 19 is preferably provided with a pulley or sheave 22 which is suitably provided with grooved portions 23. The pulleys or sheaves 20 and 22 with their grooved portions 21 and 23, respectively, are power-transmission members and are adapted to drive suitable power-transmission means connected to the car and counterweight. The power-transmission means are preferably a plurality of iron hoisting ropes or cables 24, one set of ends of said ropes or cables being connected to the elevator car or hoist 25 and the other set of ends to the counterweight 26. These hoisting ropes or cables 24, 24 constitute a set of flexible connectors between the car, the counterweight and the electric machines. The flexible connectors 24 so engage the sheaves 20, 23 that the field structures 3 and 5 will intermittently rotate in the same direction relative to each other when the car is being raised or lowered. It will also be observed that, when the system is in operation the inner rotors 4 and 6 will continuously rotate in directions the reverse of each other.

Referring to Fig. 3 the field magnets of the machines or motors 1 and 2 are electrically connected up in series and connected across the line or power mains 27, 28 and the armatures 4 and 6 are in multiple and connected across the line. The system herein shown and described is also to be provided with the usual armature starting rheostat 29, a suitable fixed resistance 30 in the field circuits, and a plain field rheostat 31 to vary the field strength of either motor in the same manner as shown in my reissued Patent No. 13,806. The field rheostat 31 is preferably placed in the car 25.

While I have shown an arrangement in which the outer rotors include the field magnets and the inner rotors include the armatures it is obvious that the outer rotors may constitute the armatures while the inner rotors would include the field magnets.

Having thus described my invention, what I claim as new and desire to secure by Letters Patent, is:

1. An electric elevator system comprising two electric machines each having two rotors, one rotor of one machine being mechanically connected to a rotor of the other machine so that they will continuously rotate in directions the reverse of each other, and the other rotors of the two machines will rotate intermittently in the same direction relative to each other.

2. An electric elevator system comprising two electric machines each having two rotors magnetically and electrically coöperating with each other and providing an armature and a field structure, one rotor of one machine being mechanically connected to a rotor of the other machine so that the two rotors will continuously rotate in directions the reverse of each other, and the other rotors will rotate intermittently in the same direction relative to each other.

3. An electric elevator system comprising two electric machines, each having an inner and outer rotor, the inner rotors being coupled together so that they will continuously rotate in directions the reverse of each other, and the outer rotors will rotate intermittently in the same direction relative to each other.

4. In an electric elevator system, the combination with a car, of two electric machines, each having inner and outer rotors, the rotors of each machine magnetically and electrically coöperating with each other and providing an armature and field structure, the inner rotor of one machine being mechanically connected to the inner rotor of the other machine so that the two inner rotors must rotate in directions the reverse of each other, the outer rotors being mechanically connected to the car.

5. In an electric elevator system, the combination with two electric machines, each having an inner and an outer rotor providing electrically and magnetically coöperating field and armature, one of the rotors of one machine being connected by gearing to one of the rotors of the other machine so that the two rotors will rotate in directions the reverse of each other and the other rotors of the two machines will rotate in the same direction as each other, and means for controlling the speed and rotation of the last-mentioned rotors.

6. In an electric elevator system, the combination with two electric machines, each having a rotatable armature and a rotatable field structure encircling said armature, said armatures being coupled together so that they will rotate in directions the reverse of each other and the field structures will rotate in the same direction relative to each other.

7. In an elevator system, the combination of two electric machines, each having a rotatable armature and a rotatable field structure encircling said armature, said armatures being coupled together so that they will rotate in directions the reverse of each other, and power-transmission members carried by and driven by said field structures.

8. In an electric elevator system the combination with a car, of a counterweight, two electric machines, each having a rotatable armature and a rotatable field structure encircling said armature, said armatures being mechanically connected together so that they will rotate in directions the reverse of each other, and means for transmitting the reactions between the mechanically connected armatures and their respective coöperating field structures to move said car.

9. In an electric elevator system, the combination with two electric machines each having a rotatable armature and a rotatable field structure encircling said armature, said armatures being mechanically connected together so that they will continuously rotate in directions the reverse of each other, means for controlling the speed and rotation of said field structures, and a flexible connector driven by each of said field structures.

10. In an electric elevator system, the combination with two electric machines, each having a rotatable armature and a rotatable field structure encircling said armature, said armatures being mechanically connected together so that they will continuously rotate in directions the reverse of each other, of a pulley driven by each of said field structures, a flexible connector engaging each of said pulleys, and means for varying the field strength of either or both of said machines.

11. In an electric elevator system, the combination with a car, of a counterweight, two electric machines having rotatable field structures and rotatable armatures, said armatures being mechanically connected together so that they will continuously rotate in directions the reverse of each other, means for varying the field strength of either or both of said machines, a pulley driven by each of said field structures, a flexible connector connected at one end to said car and passing over the pulley driven by one of said field structures and connected at the other end to the counterweight, and a flexible connector connected at one end to said car and passing over the pulley driven by the other said field structure and connected at its other end to said counterweight.

In witness whereof I sign this specification in the presence of two witnesses.

ETHELBERT M. FRASER.

Witnesses:
WM. E. HUBBARD,
NATHAN NUTTING.

Copies of this patent may be obtained for five cents each, by addressing the "Commissioner of Patents, Washington, D. C."